Aug. 31, 1943.  J. A. DORAN  2,328,264
METHOD OF AND APPARATUS FOR RECTIFYING ALTERNATING CURRENTS
Filed Sept. 25, 1939  3 Sheets-Sheet 1
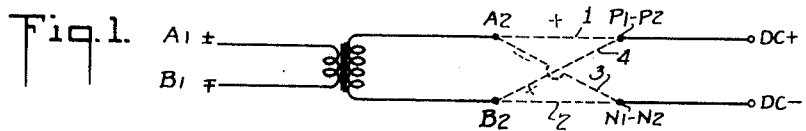
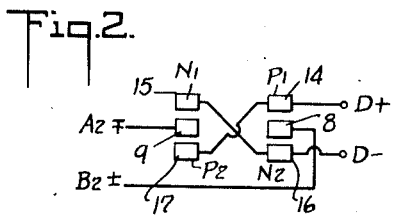
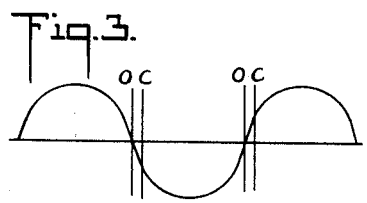
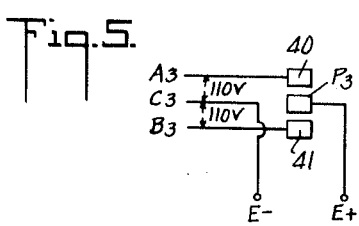
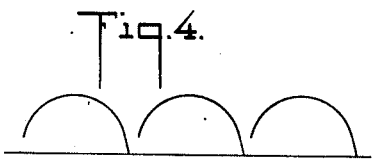
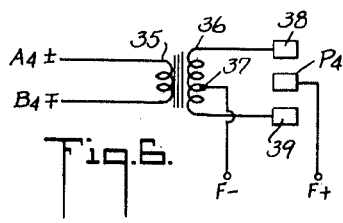
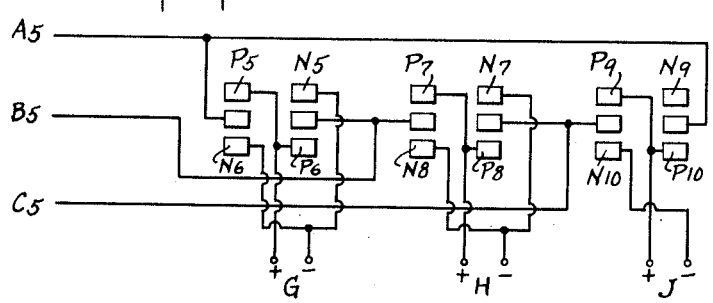
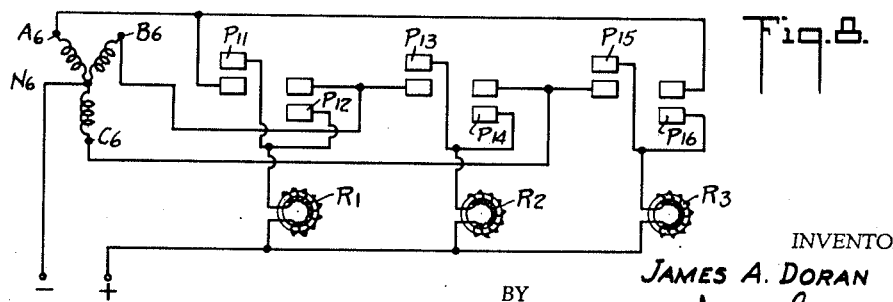
INVENTOR.
JAMES A. DORAN
BY J. A. Grier
ATTORNEY.

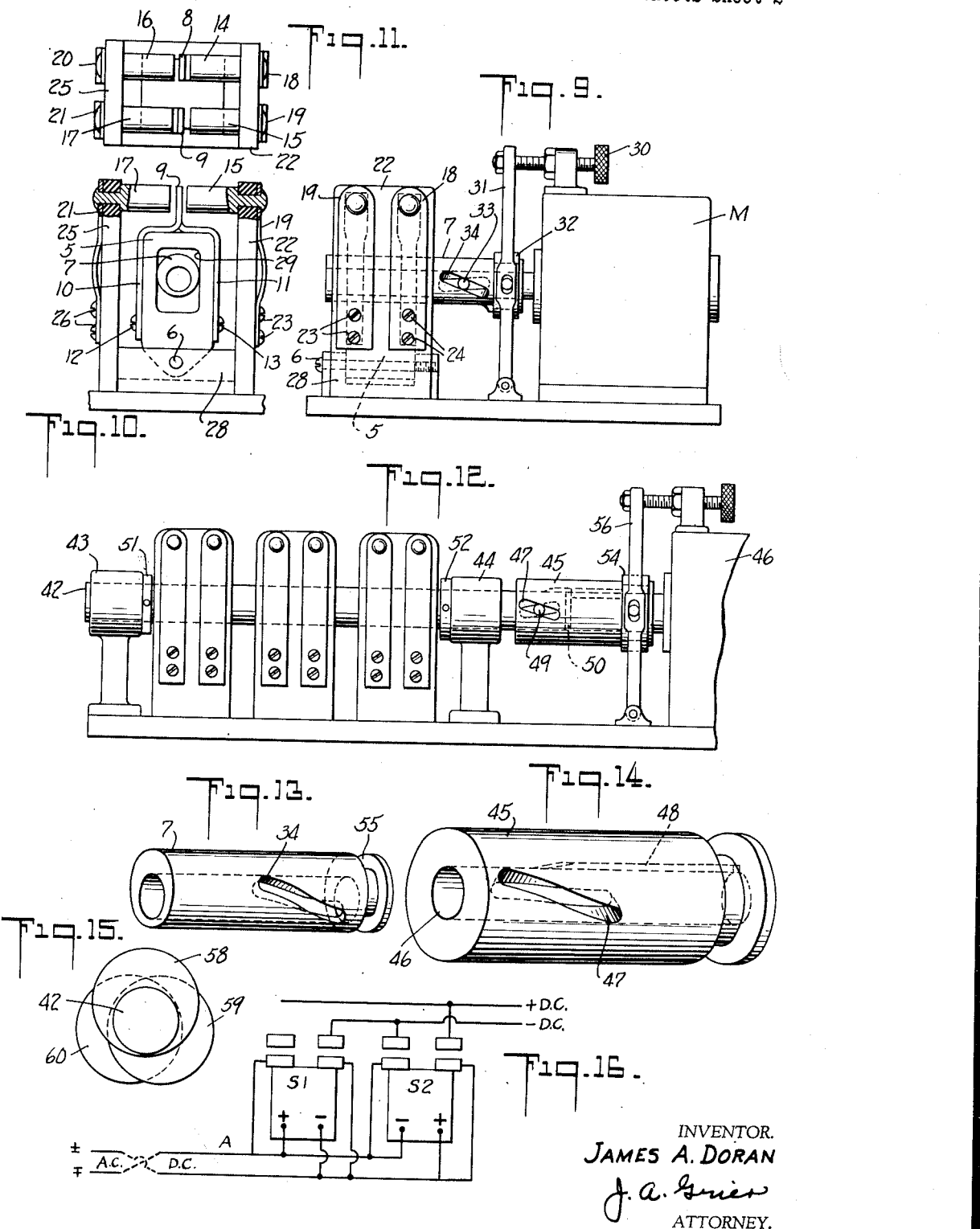

INVENTOR.
JAMES A. DORAN
BY
ATTORNEY.

Patented Aug. 31, 1943

2,328,264

UNITED STATES PATENT OFFICE 2,328,264

METHOD OF AND APPARATUS FOR RECTIFYING ALTERNATING CURRENTS

James A. Doran, Providence, R. I.

Application September 25, 1939, Serial No. 296,365

11 Claims. (Cl. 175—364)

This invention relates to improvement in method of and apparatus for rectifying alternating currents.

This application is a continuation in part of application S. N. 632,483, filed September 10, 1932, now Patent No. 2,173,828.

The main object of the present invention is the provision of novel means for mechanically transmuting the polarities of alternating current, guiding and delivering every positive impulse to a positive conductor, and every negative impulse to a negative conductor, whereby said conductors may deliver direct current for any desired purpose.

Various devices and methods are in common use for rectifying alternating current, for example, electronic, electrolytic and mercury arc types for small output capacities, and rotary converters, and motor generators for larger output capacities. All of these are of very low efficiency, and are very expensive, comparatively.

Another object of the invention is the provision of comparatively inexpensive apparatus for transmuting of alternating current into direct current, the physical size of the apparatus having no direct bearing on the specific capacity thereof.

A further object of the invention is the provision of mechanical transmuting apparatus capable of delivering substantially full wave rectification of alternating currents, at a much higher efficiency than obtainable from rectifiers now in common use.

Another object of the invention is the provision of mechanically operated rectifying apparatus of sturdy construction, which is conducive to low cost, great reliability, and eliminating the necessity of frequent renewals of expensive accessories.

Still another object of the invention is the provision of mechanically operated transmuting apparatus capable of being adjusted to deliver pulsating direct current, for electro-plating, medical purposes, etc.

Yet another object is the provision of a system of transmuting polyphase currents, including means for mechanically relegating all impulses of the positive sign to a positive direct current conductor and all impulses of the negative sign to the corresponding negative conductor.

Referring to the drawings:

Figure 1 is a schematic diagram showing a supply line of single phase alternating current, a transformer to produce the voltage desired, a diagrammatic representation of my novel double-throw reversing switch for guiding each incoming positive impulse into the outgoing positive direct current conductor, and for also guiding each negative impulse into the outgoing negative conductor; thus delivering pulsating direct current;

Figure 2 shows diagrammatically the arrangement of switching, including the contacts required to transmute and rectify alternating current according to Figure 1;

Figure 3 represents a single phase sine wave, and indicates the time the contacts open and close;

Figure 4 represents the effective current after being rectified;

Figure 5 shows diagrammatically the arrangement of contacts required to convert alternating current from three-wire system of 110–220 volts to 110 volt uni-directional current;

Figure 6 represents a single phase current transformer with a center tap on the secondary to form the negative line of the direct current supply;

Figure 7 illustrates diagrammatically the method of converting three phase alternating current into three circuits of pulsating direct current;

Figure 8 shows diagrammatically how a supply of alternating current transformed with the secondary arranged with Y connections, so that the common central neutral connection may be utilized as the negative line of the rectified direct current. The positive impulses are passed through reactances to permit joining them together, and thus give continuous direct current;

Figure 9 is a side elevation of one form of my improved motor driven switching apparatus for changing alternating current into direct current;

Figure 10 is an end elevation, partly in section showing the contact arrangement and cam means for motivating the contacts;

Figure 11 is a view of the contacts, as seen from above;

Figure 12 is a side elevation of a modification of the switching apparatus shown in Figure 9, including a plurality of contacts for rectifying three phase currents;

Figure 13 is a perspective view of the actuating cam used in the apparatus shown in Figures 9 and 10;

Figure 14 illustrates the adjustable coupling used in Figure 12;

Figure 15 is an end view of the shaft and cams used in Figure 12, showing the throws of the cams spaced 120 degrees apart, and corresponding to the phase displacement of three phase alternating current;

Figure 16 represents diagrammatically an arrangement in which two polarized relays, are used to automatically control the delivery of impulses of the proper sign to a pair of direct current conductors, thereby rectifying single phase current;

Figure 17:
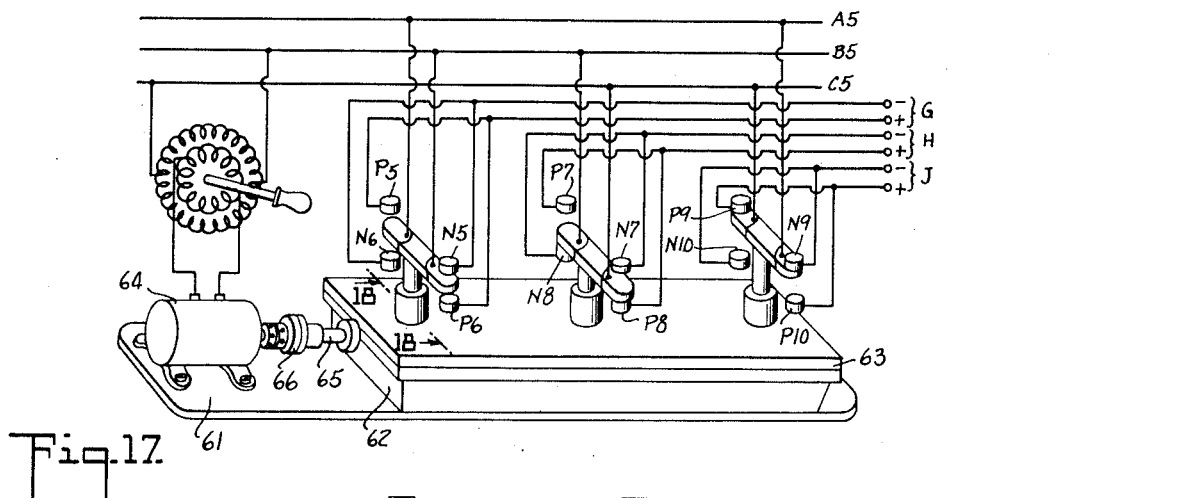
Figure 18:
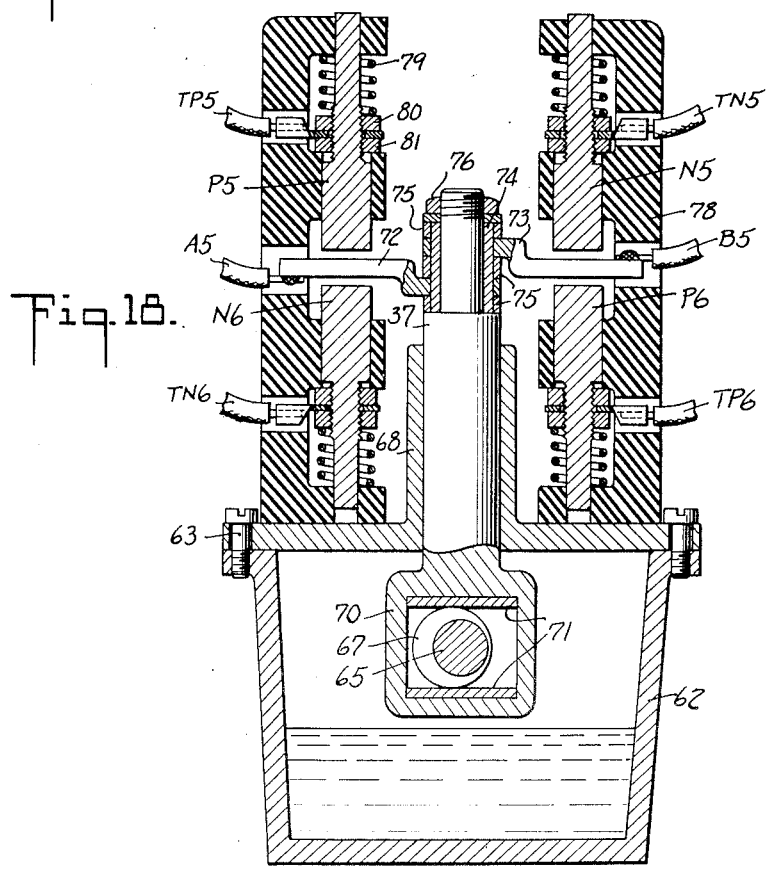

Figure 17 is a diagrammatic perspective representation of a motor driven switching apparatus employing reciprocating contact systems, and with an induction regulator associated with the motor to serve as a phase shifting means for controlling the time of contact opening so as to avoid arcing at the contacts when they open; and Figure 18 is a cross-sectional elevation taken through one of the contact units in Figure 17, on the line 18—18, showing details of the contact members and the connections thereto.

In the various types of conventional devices commonly used to rectify alternating current to direct current, there is an average loss of from 25% to 50%. On the larger installations this is a very serious and expensive waste. But with my novel apparatus, there is practically no waste of current. The only loss of current is that consumed by the synchronous motor, a negligible amount, as a 1/12 H. P. motor is sufficient for all average single-phase rectifiers, while a 1/8 H. P. motor is ample for all average three-phase rectifiers.

This is due to the fact that all the current consumed is used by the motor for opening and closing the contacts. The loss due to the opening of the contacts is practically immeasureable, due to the fact that they open at substantially the zero point.

In conventional rectifiers, the cost increases in accordance with the output required But with my transmuting apparatus, a larger output requires only that the contacts shall have sufficient cross-sectional and surface area, and sufficient spring tension to conduct the amperage desired without any overheating.

In my novel system herein described, a choke coil may be included in the alternating current circuit, in order to conveniently control the amount of current delivered, and capacitors may be used in the direct current output, in order to stabilize the output and to "iron out" pulsating effect when desired.

In the drawings and in this specification it is assumed that there is a unity power factor, with the zero points of voltage and amperage occurring simultaneously. Whenever conditions might exist where the current would be lagging behind or leading the voltage curve, adjusting means is provided to enable the operator to advance or to retard the time of opening the contacts accordingly. This adjustment may be made mechanically by having an adjustable cam or coupling; or it may be made electrically by using an induction regulator associated with the motor, in order to shift the phase time by advancing or retarding the relative time at which the opening and closing of the contacts occurs.

Inasmuch as there is no current flowing while the contacts are opening, there can be no arcing at this point, with the result that the contacts will have exceedingly long life.

When it may be necessary to have the direct current of a voltage different from that of the alternating current supply a transformer may be used as in Figure 4 or 6, preferably before transmuting. However in cases where very low voltage is required at a very high amperage rate, it may be preferable to transform the current after being transmuted, in order to avoid the necessity of employing contacts having abnormally large surface contact areas with single phase. It is practicable to transform such unidirectional current, inasmuch as it is pulsating current in which the voltage rises and falls within certain limits, and will therefore, when connected to the primary of a transformer, cause the same to function.

In Figures 1 and 2 during a half cycle when A1 is positive and B1 is negative, the impulse travels on conductors 1 and 2, respectively to the direct current circuit. During the next half cycle, A1 is negative, and the impulse is directed on the conductor 3 to DC—, the direct current negative. B1 is positive, and is directed on the conductor 4 to DC+, the direct current positive. During the next half-cycle, A1 is again positive, and travels on conductor 1; while B1 is again negative, and travels on conductor 2, and so on.

In Figure 3 the central horizontal line represents zero voltage value and the distance from the line to any given point on the curve represents + or — voltage. The distance along the line from left to right represents time. The sine curve in Figure 3 represents one and one half cycles of the alternating current, and at the points where the curve crosses the zero line the current and voltage value is zero. This is the point where the vertical line O crosses the line, and represents the time at which the contacts open. The novel switch mechanism is so designed that the opposite reversing switch contacts are closed as quickly as practicable, for example the time of closing is indicated by the line C. The closing of the switch is obviously accomplished at a point where the voltage is very low, so that the portion of the current supply not used is a negligible amount. The effective rectified curve is shown in Figure 4.

As shown in Figures 11 and 17, the transmuting switch is actuated by the synchronous motor M, operated from the same line supply that furnishes the current to be rectified, with the result that any variation in the cycle timing will occur simultaneously in both the motor and current to be rectified without affecting the sparkless operation of the contacts. When using standard 60 cycle current the motor must have a synchronous speed of 3600 revolutions per minute.

In the apparatus shown in Figure 10 the switch bar 5 is pivoted at 6 and is actuated by the eccentric hub 7, mounted on the extended shaft of the motor M. The switch bar 5 is made of suitable insulation material such for example as Bakelite. It has two contacts 8 and 9 mounted at its upper end, with conducting straps 10 and 11 respectively, and terminals 12 and 13 respectively, to which are to be connected the single phase alternating current supply. The movable contacts 8 and 9 oscillate between the stationary contacts 14 and 15 at one stroke, and 16 and 17 at the opposite stroke. These stationary contacts are respectively mounted at the ends of spring levers 18, 19, 20, and 21, so as to furnish sufficient tension on the closed contacts to permit the flow of current without undue heating. These spring levers also furnish a sufficient amount of contact travel or stroke to permit the contacts to rub together as they close, which will insure that the contacts remain clean. Also, the greater the movement of contacts 8 and 9, the more the time increment between the opening and the closing of the contacts is reduced.

The lever springs 18 and 19 are mounted on the post 22 in such a manner that the contact heads 14 and 15 respectively may be freely moved outward, while the upper end of these lever springs will normally rest against and contact the face of the post 22, thereby restraining further movement of the contacts inwardly and insuring the correct position of the faces of the contacts while at rest. The screws 23 and 24 secure the spring levers to the post, and also serve as terminals for the conducting cables. Similarly, the lever springs 20 and 21 are respectively mounted on the post 25 with screws 26 and 27, the latter being not shown. The posts 22 and 25 are made of insulation material.

The base 28 is slotted to support the switch bar 5, and carries the pivot pin 6, on which the bar 5 oscillates. In the body of the bar 5 is a vertical slot 29, in which the eccentric hub 7 revolves, to impart the oscillating motion to the bar 5.

The details of the transmuting switch are illustrated in Figures 9, 10 and 11, while a diagram of the current flow is shown in Figure 2. A2 and B2 are the cables carrying single phase alternating current, connected to the contacts 8 and 9 via the terminals 12 and 13 respectively. When contacts 8 and 9 bear against contacts 15 and 14 respectively, 8 is of positive polarity, while 9 is negative. The current impulse is thus conducted to the direct current supply terminals D+ and D—. At the next zero point, bar 5 moves contacts 8 and 9 to open position, and instantly connects 8 and 9 to the contacts 16 and 17 respectively. Now 8 is negative, and 9 is positive; and the current impulse is conducted with correct polarity to the direct current supply terminals thus rectifying a complete cycle. The terminals 24 and 26 are connected together to feed the positive supply, and the terminals 23 and 27 are connected together to feed the negative supply. An adjusting screw 30 moves lever 31 and thrust collar 32 to advance or retard the relative relation of the cam 7. The motor shaft has a pin 33 mounted therein which forms a working fit with a helical slot 34 formed in the cam member 7. Details of the slot 34 may also be seen in Figure 13 which shows a perspective view of the cam. A groove 55 which accommodates the thrust collar 32 may also be seen. With unit power factor the position of the pin 33 for neutral may be at about the midpoint of the slot, and with the motor running clockwise as viewed from the right end in Figure 9, advancing positions of the pin would be between the center and the left end of the slot, while retarding positions would be between the center of the slot and its right end.

When converting single phase current that requires a change of voltage, as in Figure 6, a transformer is used to change the voltage preferably before rectifying the same. In such instances, it may be preferable to have a single primary winding 35, and a double secondary winding 36 with a center tap 37. Then tap 37 can feed direct to negative line F— of the direct current circuit, so that only one set of contacts is required for the positive side of the circuit. The oscillating bar 5 would then carry only one contact P4, striking two opposite contacts 38 and 39. In this arrangement the oscillating contact would receive positive current and deliver the same to the positive side F+ of the direct current circuit. The stationary contacts 38 and 39 would deliver the positive alternating impulses, and P4 would contact them at the proper time to receive such positive impulses.

In converting single phase current from a three-wire supply system of 110–220 voltage, as in Figure 5, the neutral wire is utilized as the negative line E— of the direct current circuit. Then, similar to Figure 6, the oscillating contact P3 delivers the positive line E+ of the direct current circuit. The stationary contacts 40 and 41 deliver the alternate positive impulses when P3 contacts each at the proper time.

When three-phase current is to be changed to direct current, three switching units are required, as shown in Figures 7 and 12; each unit operating as described above. These units must operate at equal intervals of time; accordingly, three eccentric hubs are mounted on the shaft 42, each spaced 120 degrees apart. As this shaft requires a considerable length, the arrangement in Figure 9 is modified as shown in Figure 12 in the use of a separate shaft 42 carried in two bearings, 43 and 44. This shaft is connected with the synchronous motor 46, by a coupling 45, which may employ any convenient means for adjusting the rotative relation of the shaft 42.

The coupling member 45 has a helical groove or slot 47 extending through its wall to its bore 46. A keyway 48 permits the coupling 45 to slide axially on the keyway in the motor shaft. The shaft 42 carries a pin 49 which extends into and forms a working fit with the slot 47. A washer 50 is positioned between the end of the motor shaft and the adjacent end of the shaft 42 to prevent any axial movement of either. The shaft 42 also carries collars 51 and 52 which member up respectively with the bearings 43 and 44 to prevent any end play in said shaft.

An annular groove 53 is formed near one end of the coupling 45 to cooperate with a thrust collar 54 which is shifted by a pivoted lever 56. A screw arrangement 57 is provided for advancing or retarding the relation of the shaft 42 relative to the motor shaft.

Cams 58, 59, and 60 carried on the shaft in fixed relation 120 degrees apart, respectively control the contacts in the groups 58a, 59a, and 60a in the same manner as described in connection with Figure 5, the only difference in Figure 7 is that there are a double set of contacts for each phase.

The oscillating bars shown in Figures 9, 10, 11, and 12 are designed for smaller units where minimum cost is important, or where the service is occasional. But where the service may be continuous or where high amperage must be converted, it is preferable to use the modification shown in Figures 17 and 18.

A base 61 carries a casing with a cover plate 63 secured thereto. The synchronous motor 64 is mounted on the base 61 and the shaft 65 through a suitable coupling 66, at a speed of 3600 R. P. M., in order to operate at 60 cycles per second. This shaft carries three cams, one for each phase, spaced 120 degrees apart to operate three contact units. One of these cams is shown at 67 in Figure 18, which also shows the plate 63 with an upstanding boss 68 to serve as a bearing for the reciprocating rod 69, carrying a closed box yoke 70 which is actuated by cam 67 on shaft 18'. Hardened steel plates 71 line 70 to promote long wear. The casing 62 is filled with oil to the proper level so that all bearings and reciprocating parts are properly lubricated. The rod 69 carries two contact arms 72 and 73 insulated from the shank of the bar and from each other by a suitable insulating bushing 74 and collars 75, and are secured thereto by a nut 76. The arm 72 strikes contacts P5 and N6, while arm 73 strikes contacts N5 and P6. These contacts reciprocate respectively in the blocks 77 and 78. Each contact is held by a spring 79 against a stop adjustable by nuts 80 and 81, in the position shown. Each contact should be so adjusted that arms 72 and 73 will leave and open at the point of zero current. As a check on this adjustment, with the contacts not engaged, there must be a definite gap distance between them. This distance has a direct relation with the stroke of the rod 69. Between each pair of adjusting nuts is secured flexible terminal connectors, whereby TP5 and TP6 are joined to a common positive terminal, while TN6 and TN5 are joined to a common negative terminal. The arms 72 and 73 each have a flexible connector A5 and B5 leading to a terminal post which is designed to receive the alternating current line supply. These A. C. and D. C. terminal posts, not shown in the drawings, are to be located wherever convenient—as on a suitable switchboard located on or adjacent to the apparatus. Wherever it is required to rectify single phase only, this apparatus may be built with one unit only, instead of with three units as illustrated in Figure 17.

When this three-phase rectifier is to be used in a service where there are many circuits installed, there may be no advantage in joining together the three sets of rectified current. In such case each rectified phase may supply a definite number of separate circuits.

On the other hand if it is to be used in a service where it is preferable to join the three rectified phases, the system shown in Figure 8 may be employed. The alternating current supply is transformed so as to provide a "Y" system, with lead wires from A6, B6, and C6, and with a neutral 6N that serves as the negative line in the direct current service. In this system, the reciprocating arms are as shown in Figure 18, but the N contacts are omitted. In joining the rectified positive of each phase together suitable means to compensate for the unequal variable voltage in each line, such as reactance units R1, R2, and R3 may be employed. This system produces continuous direct current with a slight ripple in voltage which is advantageous in many uses requiring direct current. A particularly valuable use is in connection with 25 cycle current used single phase for lighting. In such cases, three phases of 25 cycle current rectified and joined together would produce a continuous lighting current, thereby remedying an unsatisfactory condition at a very minor cost. On the other hand, to change a system or city from 25 cycles to 60 cycles involves a prohibitive cost.

For commercial use, my novel apparatus above described would be equipped with a switch board panel, provided with proper terminals, switches, fuses, and meters for conveniently controlling incoming and outgoing current. On such panel, provision should be made for automatically starting the synchronous motor before current is connected to the transmuting switches, so that the motor may attain its synchronous speed before the switches are receiving current. When the synchronous motor is started, it is uncertain which half-phase will be first acted upon. For some uses, such as operating direct current motors, it is immaterial which pole is positive or negative. But in many uses, such as battery charging or electroplating, this polarity must be constant. Therefore, a set of polarized relays as shown in Figure 15 should be located on the switch board panel for insuring that the direct current will always have the same polarity. The current from the transmuting switch will operate only one relay and thereby connect the feeder having the required polarity to the outgoing line.

I have discovered that the pulsating direct current delivered by my novel transmuting system gives a novel and valuable advantage when used for electroplating, in view of the fact that the transmuting switch mechanism permits the adjustment of the blank period to as short or as long a time interval as desirable.

In the electroplating industry, it is necessary for each shop to generate the direct current required, the voltage varying from 1 to 8 volts depending upon, the metal to be deposited, the size of the tank, the resistance of the electrolyte, etc. When plating any metal upon a highly finished article it is essential to preserve the polished surface so that the article will not require additional polishing after being plated. But with continuous current plating the polished surface becomes discolored or cloudy after a short time of immersion in the electrolyte, making it necessary to remove the article from the electrolyte bath and cleanse or "scratch brush" the surface to restore the polished surface. The article is then replaced in the bath, and again electroplated. When a heavy coat of plating is required, several plating immersions and several cleansings are necessary.

On the other hand when plating with pulsating current produced with my novel transmuting switch, the discoloring and clouding does not occur; therefore the article may remain in the electrolyte bath for as long a period of time as required to obtain the desired thickness of coating. As near as can be determined this intermittent current is the equivalent of many individual platings, each impulse being of such short duration that the highly polished surface on the article is not affected.

Furthermore, the intermittent current agitates and activates the electrolyte bath and thus permits using a higher voltage, which accelerates the rate of deposit without discolorations on the finished surface.

When continuous direct current is used for electroplating, the anode is positive and continuously liberates oxygen and the article being plated becomes enveloped in oxygen gas which builds up a certain resistance against the flow of current and metal from the anode. Also the article (which is the cathode) liberates hydrogen continuously, and thus is built up a further resistance to the receiving of a deposit.

It would seem that the intermittent direct current, provided by my novel transmuting switch, due to the fact that each impulse is of such short duration, does not effect the liberation of sufficient oxygen and hydrogen to interfere with the rate of depositing; therefore, this novel system of electroplating provides a method whereby any desired thickness of coating may be obtained with one immersion without affecting the surface and polish of the article.

There are many other general uses for my novel transmuting apparatus, such as for X-ray work, battery charging, telephone current, radio current, fire and signal systems, elevator motors, electric locomotives, street cars, etc. In many of the older sections of various cities, there are zones that have always been supplied with direct current, and owing to the prohibitive cost of replacing equipment, the central stations have been compelled to continue service mains of direct current to those zones. It would be practicable for the central stations to install my transmuting apparatus for each customer or for each building; supply all such demands with their standard alternating current, and abandon their direct current supply lines together with the equipment for producing the current, with a tremendous saving of expense.

Although I have herein given several examples of simple embodiments, it must be understood that they are given by way of example only and that the scope of the invention is only limited by the annexed claims.

I claim:

1. In a current conversion system for converting alternating current, from a three wire supply system into unidirectional current, a substantially inflexible oscillatable member, opposed contacts rigidly secured thereto, rotary means and reciprocal means driven by said rotary means to oscillate said member in synchronism with the phase reversals of said alternating current, a pair of contacts, one positioned adjacent to each limit of the amplitude of said member to be alternately contacted by said opposed contacts, a resilient support for each contact of said pair, restraining means engaging said resilient supports to define the positions of said last contacts with respect to said limits and permitting said last contacts to move with their cooperating contacts after engagement therewith, a connection between said member and the positive feeder of said unidirectional current, connections from the two outside wires of said system to said pair of contacts, a connection from the center or third wire of said system and the negative feeder of said unidirectional current, whereby said member receives the positive half cycles from both sides of said system and delivers them to said positive feeder, and means between said rotary means and said oscillatable member for setting the latter so that its contacts break contact with the contacts of said pair in time with the zero values of said alternating current and insuring zero sparking at said contacts.

2. In a rectifying system an alterating current circuit, a direct current circuit to be fed by said first circuit, a rigid double pole double throw switching means connected between said circuits, said switching means including pairs of adjacent stationary contact points with cooperative movable contact points therebetween, the latter being adapted to disconnect said circuits from each other and to immediately reconnect them in reversed relation at each reversal of phase of the alternating current, adjacenet resilient supports for said stationary contacts points, restraining means engaged by said supports for establishing the normal distance between the faces of the contact points carried by said supports, a substantially rigid movable arm fixedly supporting said movable contact points, motor means under control of said alternating current for operating the movable arm of said switching means, and means between said motor means and said switching means for setting said system and insuring that the instants in which said circuits are disconnected coincide with the times at which the value of said alternating current is zero.

3. In a rectifying system an alternating current circuit, a direct current circuit to be fed by said first circuit, a double pole double throw switching means connected between said circuits, said switching means including two pairs of spaced contact points facing each other and a movable contact arm for each pair, each arm carrying contact points adapted to alternately cooperate with its pair of spaced contacts, said contact arms being adapted to disconnect said circuits from each other and to immediately reconnect them in reversed relation at each reversal of phase of the alternating current, supports for said pairs of spaced contact points permitting the faces of the latter to establish rubbing contact with the faces of said movable contacts when engaged by said movable contacts, a synchronous motor for driving said switching means, said motor operating on current from said alternating current circuit, a variable coupling positioned between said motor and said switching means for adjusting the timing of the latter with respect to said motor for insuring that the instants in which said circuits are disconnected by said switching means coincide with the time at which the value of the alternating current is zero, a shifting lever associated with said variable coupling and screw thread means for moving said lever in either direction whereby said timing may be micrometrically adjusted in either direction and locked.

4. Any current conversion system for converting alternating current from a three-phase supply system into unidirectional current, means for Y connecting said three-phase system, a connection from the midpoint Y to the negative line of the system that is to carry direct current, a reversing switch in each of said phases, means to drive all of said reversing switches in synchronism with the reversals of said alternating current, a connection from the first of said phases to the movable contacts in the first and second of said reversing switches, a connection from the back contact of said first reversing switch to the positive line of the system that is to carry the direct current, said connection including a choke coil; a connection from the forward contact of the second reversing switch to said positive line, said connection including a second choke; a connection between the second of said phases and a moving contact in the second and third reversing switches; a connection to a back contact in said second reversing switch, said last connection also passing through said second choke; connections between a forward contact in said third reversing switch and said positive line, said connection including a third choke; connections between the third of said phases and movable contacts in said third and said first reversing switches; a connection between a back contact in said third reversing switch and the positive line, said connection also passing through said third choke; a connection between a forward contact in said first switch and the positive line, said last connection also passing through said first choke, a synchronous motor connected to said alternating current for driving all said movable contacts to cause them to operate in time with the reversals of the alternating current; and means for adjusting said timing so as to cause said contacts to open at times into which the current values in the phases, with which they are associated, is zero.

5. In a current conversion system a reversing switch comprised of, a base, a frame, a pair of oppositely disposed contacts carried by said frame, said contacts having their active ends slightly spaced apart from each other in order to alternately cooperate with the movable contact therebetween, a block pivotally mounted in said frame and having a rectangular hole formed therein, a supporting member secured to said block and carrying a double faced contact, a motor mounted on said base, an eccentric on said motor shaft extending into and forming a working fit with interior walls of the hole in said block, a helical slot formed in said eccentric, a pin carried by the motor shaft and having its end positioned in said slot; whereby when said eccentric is moved longitudinally, the time of the make and break between the movable contact and the stationary contacts is advanced or retarded; and means carried on said base for moving said eccentric longitudinally in either direction.

6. The invention according to claim 5, in which two sets of stationary contacts are supported in said frame, and in which two movable contacts are provided, one cooperating with said first set of stationary contacts and the other cooperating with said second set of stationary contacts.

7. The invention according to claim 5, in which three frames are mounted on said base paralleling the shaft, all of said frameworks carrying stationary and movable contacts as described, an eccentric for each of said frames cooperating with the blocks therein, said eccentrics having their major axes in the fixed angular relation of 120 degrees apart.

8. A phase inverting switch, comprising a synchronized oscillating member with contacts having terminals connected to an alternating current supply, two sets of stationary contacts resiliently supported and adapted to be alternately engaged by the contacts on said oscillating member, a synchronous motor actuating said oscillating member; the receiving contacts of like polarity being connected together, to provide the terminals for delivery of transmuted unidirectional current, and means for setting said contacts to break contact in time with the instants in which the values of said alternating current is zero.

9. In a current conversion system for transmuting alternating current into unidirectional current, a reversing switch including opposed stationary contact points, a support forming a mounting for said points preventing said points from moving towards each other more than a predetermined distance and freely permitting each of said points to move in a direction away from the other, an arm, oppositely disposed contact points on said arm adapted to be moved by said arm into alternate cushioned engagement with said stationary contact points.

10. The invention according to claim 9, in which said arm has mechanism associated therewith driven by a synchronous motor, and in which settable means is provided between the motor and said mechanism by means of which the times at which said contact points are disengaged from each other coincides with the times at which the alternating current values are equal to zero, whereby zero sparking is obtained at said points, and due to said cushioned engagement of the contact points, tendency to mushroom and get out of time is eliminated.

11. In a current conversion system, a single phase alternating current circuit, a uni-directional current circuit, reversible switching means between said circuits including a pair of contact points spaced apart from and facing each other, cushioning supports for said contact points, and a substantially rigid movable contact member carrying contact points adapted to cooperate alternately with said spaced contact points, means influenced by current from said first circuit for moving said member to cause one of its contacts to break contact with the stationary point with which it cooperates each time the alternating current arrives at zero value and to immediately cause its other contact point to establish contact with the other stationary contact point, thereby delivering unidirectional current to said second mentioned circuit.

JAMES A. DORAN.